E. A. ANDERSON.
DITCHING MACHINE.
APPLICATION FILED JULY 10, 1913.
1,202,257.
Patented Oct. 24, 1916.
2 SHEETS—SHEET 1.
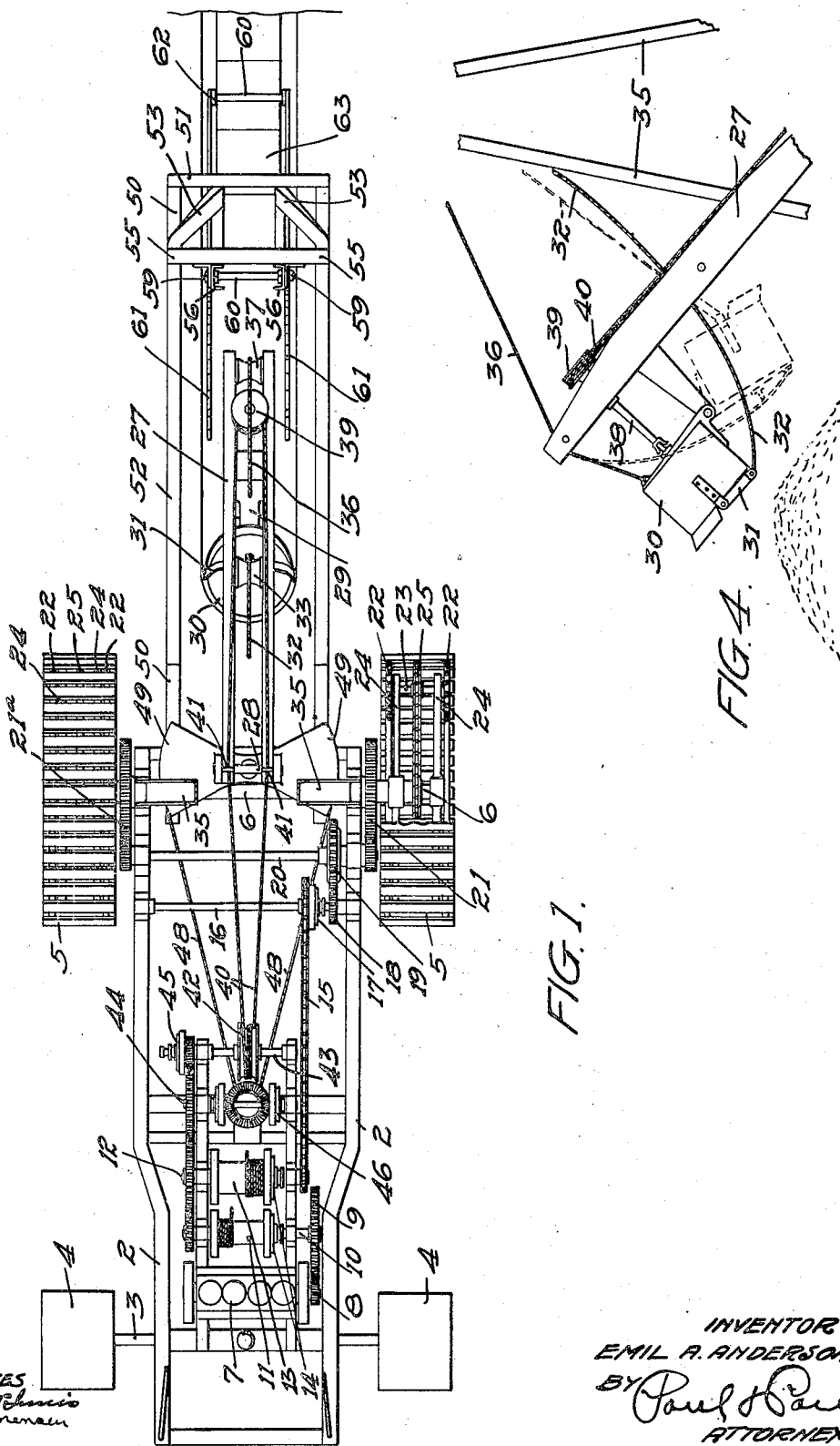
INVENTOR
EMIL A. ANDERSON

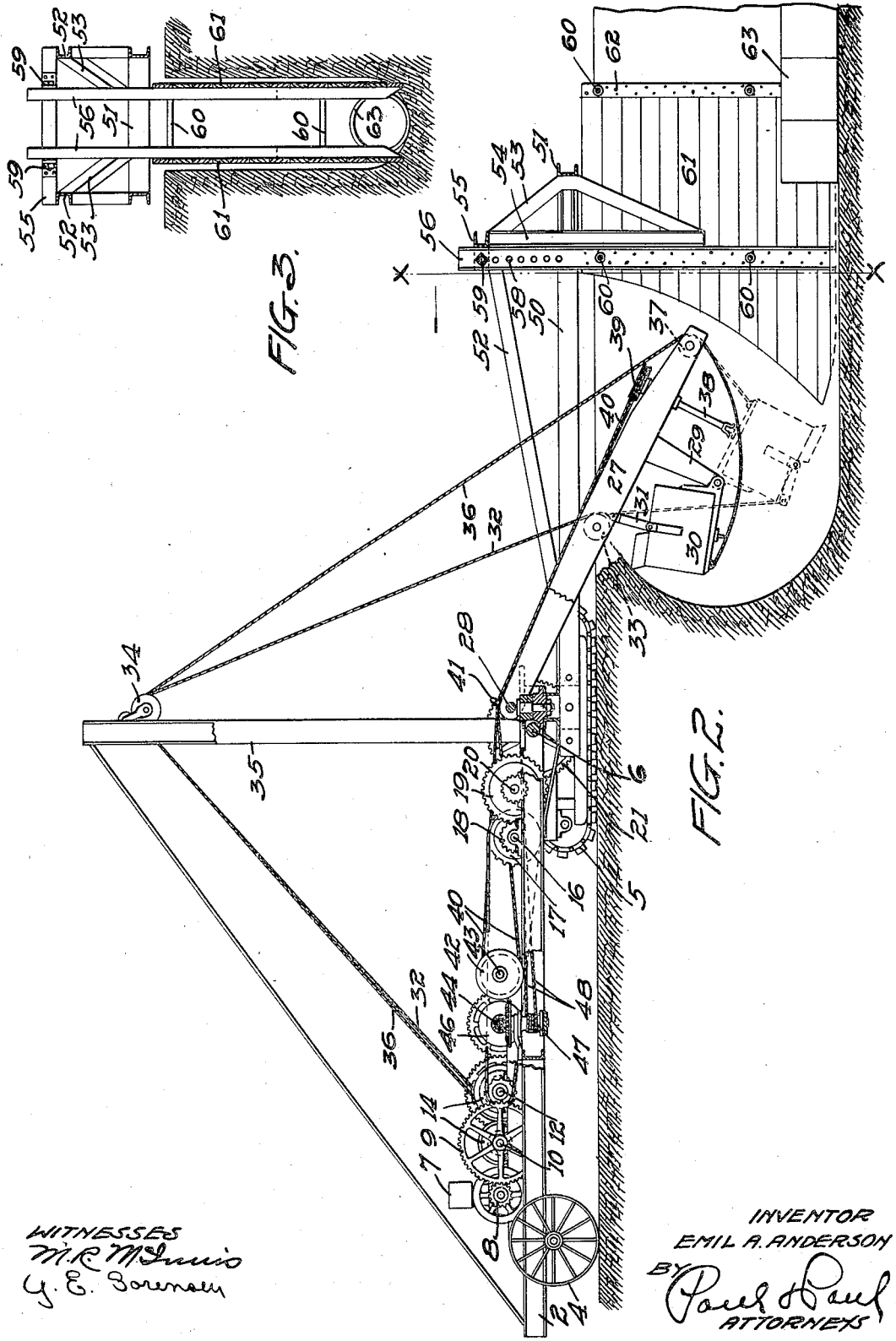

UNITED STATES PATENT OFFICE.

EMIL A. ANDERSON, OF SWEA CITY, IOWA.

DITCHING-MACHINE.

1,202,257.   Specification of Letters Patent.   Patented Oct. 24, 1916.

Application filed July 10, 1913. Serial No. 778,307.

*To all whom it may concern:*

Be it known that I, EMIL A. ANDERSON, citizen of the United States, resident of Swea City, Kossuth county, Iowa, have invented certain new and useful Improvements in Ditching-Machines, of which the following is a specification.

My invention relates to machines for cutting a deep narrow ditch adapted to receive tile.

The object of my invention is to provide a means which will positively prevent the caving in of the side walls of the ditch during the operation of laying the tile.

A further object is to provide improved means for handling the excavating dipper adapted for cutting a ditch of this kind.

The invention consists generally in various constructions and combinations, all as hereinafter described and particularly pointed out in the claims.

In the accompanying drawings forming part of this specification, Figure 1 is a plan view of a ditching machine embodying my invention, Fig. 2 is a vertical sectional view of the same, Fig. 3 is a transverse sectional view on the line $x$—$x$ of Fig. 2, Fig. 4 is a detail view of the apparatus for operating the excavating dipper.

In the drawing, 2 represents the frame of the machine, having a forward axle 3 and forward carrying wheels 4. An axle 6 is mounted in the rear portion of the frame. 7 is the engine, mounted on the forward portion of the frame and having its shaft provided with a pinion 8 meshing with a large gear 9 on the shaft 10 of the drum 11. A shaft 12 is arranged parallel with the shaft 10 and geared thereto at one end and provided with a second drum 13, said drums having clutch devices 14 by means of which they will be rendered operative or inoperative in the usual way. A drive belt 15 connects the shaft 12 with a shaft 16 near the rear of the machine and this shaft has a clutch device 17 for rendering the driving connection with the traction belts operative or inoperative, as desired. The shaft 16 also has a gear 18 meshing with a differential gear 19. One member of the differential is mounted on a shaft 20 which extends transversely of the machine and the other member has a driving connection with a gear 21 on the axle 6. A sprocket drive connection is provided at 22 with a shaft 23 that is journaled in bearings in the frame 24. The gear 21 has a driving connection through a belt 25 with the shaft 23. A similar construction is provided on the opposite side of the machine. Each traction belt is thus positively driven, the differential mechanism 19 accommodating itself to the movement of the belts in turning the machine, as usual in devices of this kind.

A boom 27 is pivoted at 28 on the machine frame and is provided with depending arms 29 on which an excavating bucket 30 is pivoted. This bucket has a bail 31 at its open end to which one end of a cable 32 is attached and passes over a sheave 33 on the boom to a swiveled sheave 34 on a mast 35, and from thence to the drum 13. This drum may be designated as the loading or lifting drum. A cable 36 is attached to the bottom of the bucket and passes around a sheave 37 at the end of the boom and over a sheave on the mast to the dumping drum 11, which operates to swing the bucket to an inverted dumping position, as indicated by full lines in Fig. 4. The shaft 38 is mounted in the end of the boom and has a clutch connection at one end with a cleaning device mounted in the bucket and adapted to rotate therein to loosen the material which may be clinging to the walls of the bucket. This cleaning device forms the subject matter of a pending application herewith, filed June 13, 1913, Serial No. 773,441, and I make no claim to the same herein.

The upper end of the shaft 38 has a sheave 39 having a running connection with a cable 40, which passes back through guides 41 on the mast to a drum 42 mounted on a shaft 43, and geared to a shaft 44 which in turn is geared to the shaft 12. A shaft 43 is provided with a clutch device 45 of ordinary construction for rendering it operative or inoperative. The shaft 44 also has a clutch device 46 and is geared to an upright drum 47, as shown in Fig. 2, from which a cable 48 extends to quadrants 49 rigidly mounted on the pivoted end of the boom. By the operation of this drum the cables 48 are operated to rock the quadrant 49 in a horizontal plane and swing the boom either to the right or the left of the machine, as may be desired.

At the rear of the machine I provide rails 50, parallel with one another and connected at their forward ends to the machine frame and having a series of holes 50′ for longitudinal adjustment in said frame. Brace rails 52 are provided for the rails 50 having at their rear ends inwardly inclined braces 53 which are secured to upright bars 54. These upright bars are connected across the top by a rail 55 and have long bearing surfaces on upright posts 56 and are adjustable vertically on said posts by means of holes 58 arranged one above another in said posts and adapted to receive bolts 59 carried by the cross rail 55. This adjustment of the draft rails on the upright posts allows the rails to be set horizontally with respect to the ground line and compensates for the different depths of the ditches in which the machine may be working. Cross bars 60 are provided between the posts and wings 61, composed preferably of a suitable sheathing, are secured to the posts 56 and have lower portions in the form of shoes which are adapted to slide upon the bottom of the ditch. The posts 56 are preferably interposed between the forward portions of the wings and the rear portions thereof are provided with bars 62 and cross braces corresponding to those described between the posts 56. The wings are spaced apart a sufficient distance to move easily in the ditch and provide room for a workman to stand in the ditch and lay the tile 63 as the ditch is excavated and the machine is moved along. In a ditch of this depth there is danger of a cave-in and injury to the workman. These traveling wings will positively prevent any caving in at the point where the workman stands.

By having the bucket pivotally supported below the boom and swinging toward the pivot of the boom to pick up the load, I am able to reduce the distance between the rear of the machine and the guard wings and thereby operate the trailing wings more efficiently and prevent to a considerable extent the caving in of the ditch between the wings and the rear of the machine, which often happens where the trailing device is located at a considerable distance in the rear.

The operation of the machine is as follows: The boom is lowered to its working position and the bucket swung on its pivots toward the machine on the pivoted end of the boom to gather up its load. When the bucket is filled, the boom is raised and swung to one side in the usual way. When the required depth of ditch is reached, the machine is moved along, the trailing wings following close to the boom and sliding over the bottom of the ditch. A sufficient space is provided between the guard wings to allow the workman to stand in the bottom of the ditch without danger of injury from caving in of the ditch walls, and although the ditch may be filled over the tile in the rear of the guard wings, the workman can work and walk between them in perfect safety. Furthermore, there is such a comparatively short distance between the guard wings and the excavating bucket that there is comparatively little danger of the walls caving in front of the wings.

I claim as my invention:—

1. In an excavating apparatus, the combination with a main frame supporting excavating mechanism and actuating means therefor, of a secondary frame comprising spaced draft bars secured to and extending rearwardly from and freely beyond said main frame, and a pair of spaced vertically disposed guard wings carried by said bars adjacent their rear ends and for vertical adjustment with respect thereto to slide within the excavation made by said apparatus.

2. In an excavating apparatus, the combination with a main frame supporting excavating mechanism and actuating means therefor, of a secondary frame comprising spaced draft bars secured for longitudinal adjustment with respect to and extending rearwardly from said main frame, and a pair of spaced guard wings carried by and adapted for vertical adjustment with respect to said bars to slide within the excavation made by said apparatus.

3. In an excavating apparatus, the combination with a main frame pivotally supporting for vertical movement a rearwardly extending excavating boom, a secondary frame comprising spaced rearwardly extending draft bars secured for longitudinal adjustment at their forward ends to the main frame and accommodating said excavating boom therebetween, and a pair of spaced guard wings carried by and adapted for vertical adjustment with respect to said bars to slide with the excavation made by said boom.

In witness whereof, I have hereunto set my hand this 5th day of July, 1913.

EMIL A. ANDERSON.

Witnesses:
O. R. ROWLEY,
C. W. PEARSON.